US008706703B2

(12) United States Patent
Factor et al.

(10) Patent No.: US 8,706,703 B2
(45) Date of Patent: Apr. 22, 2014

(54) EFFICIENT FILE SYSTEM OBJECT-BASED DEDUPLICATION

(75) Inventors: Michael Factor, Haifa (IL); Joseph Samuel Glider, Palo Alto, CA (US); Danny Harnik, Tel Mond (IL); Elliot K. Kolodner, Haifa (IL); Dalit Naor, Tel Aviv (IL); Demyn Lee Plantenberg, Sunnyvale, CA (US); Eran Rom, Tel Aviv (IL); Sivan Tal, Sarid (IL); Paula Ta-Shma, Tel Aviv-Jaffa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/169,069

(22) Filed: Jun. 27, 2011

(65) Prior Publication Data

US 2012/0330904 A1    Dec. 27, 2012

(51) Int. Cl.
    *G06F 7/20* (2006.01)
(52) U.S. Cl.
    USPC .......................................... 707/692
(58) Field of Classification Search
    None
    See application file for complete search history.

(56) References Cited

U.S. PATENT DOCUMENTS

| 5,819,292 | A * | 10/1998 | Hitz et al. ........................... 1/1 |
| 6,389,433 | B1 * | 5/2002 | Bolosky et al. .............. 707/749 |
| 2008/0294696 | A1 * | 11/2008 | Frandzel ...................... 707/200 |
| 2009/0204636 | A1 * | 8/2009 | Li et al. .................... 707/103 Y |
| 2010/0088296 | A1 * | 4/2010 | Periyagaram et al. ........ 707/705 |
| 2010/0121825 | A1 * | 5/2010 | Bates et al. .................. 707/692 |
| 2011/0035357 | A1 * | 2/2011 | Ting et al. .................... 707/634 |
| 2012/0124105 | A1 * | 5/2012 | Provenzano .................. 707/813 |

\* cited by examiner

*Primary Examiner* — Rehana Perveen
*Assistant Examiner* — Hung Havan
(74) *Attorney, Agent, or Firm* — F. Jason Far-hadian, Esq.; Century IP Group.

(57) ABSTRACT

In accordance with one or more embodiments, an inode implemented file system may be utilized to support both offline and inline deduplication. When the first content is stored in the storage medium, one inode is used to associate a filename with the data blocks where the first content is stored. When a second content that is a duplicate of the first content is to be stored, then a parent inode is created to point to the data blocks in which a copy of the first content is stored. Further, two inodes are created, one representing the first content and the other representing the second content. Both inodes point to the same parent inode that points to the data blocks where the first content is stored.

20 Claims, 8 Drawing Sheets

EFFICIENT FILE SYSTEM OBJECT-BASED DEDUPLICATION

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to deduplication in a data storage system.

BACKGROUND

In computing, deduplication refers to a technique in which redundant data is deleted from the storage space to improve storage utilization. In the deduplication process, the goal is to retain only a single copy of the data that is to be stored, as opposed to storing multiple copies of the same data. Accordingly, blocks of data that are or are to be stored on a storage medium are compared to detect the duplicate copies. Each block of data is assigned an identification or a signature that is typically calculated using cryptographic hash functions.

In general, if the signatures of one or more data blocks are identical, then it is assumed that the data blocks are duplicates (i.e., bitwise identical). As such, the data block signatures for the file content are compared with signatures in a hash table—a data structure that maps the signature of the file content to data blocks in storage media. If there is a match, then instead of having duplicate copies of the same content, a corresponding reference is created to the matching content already stored in the file system. Thus, deduplication process may be applied to deduplicate files that are either being written to a storage media or to files that have been already stored on storage media. The former is referred to as real-time or online deduplication. The latter is referred to as post-processing or offline deduplication.

The common goal of both deduplication methods mentioned above is to minimize the volume of data stored on the storage media by respectively either preventing or removing the duplicate data blocks from a storage system. The online deduplication approach in addition helps reduce data transfer rate and improves communication bandwidth especially when storage media is remotely located with respect to the source, because in an inline deduplication approach, the duplicate data is not written to a storage device to begin with. As such, there is no need to transfer the data from a source to a destination storage device, if it is determined that the data is a duplicate of data already stored on the destination storage device.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one or more embodiments, an inode implemented file system may be utilized to support both offline and inline deduplication. When the first content is stored in the storage medium, one inode is used to associate a filename with the data blocks where the first content is stored. When a second content that is a duplicate of the first content is to be stored, then a parent inode is created to point to the data blocks in which a copy of the first content is stored. Further, two inodes are created, one representing the first content and the other representing the second content. Both inodes point to the same parent inode that points to the data blocks where the first content is stored.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
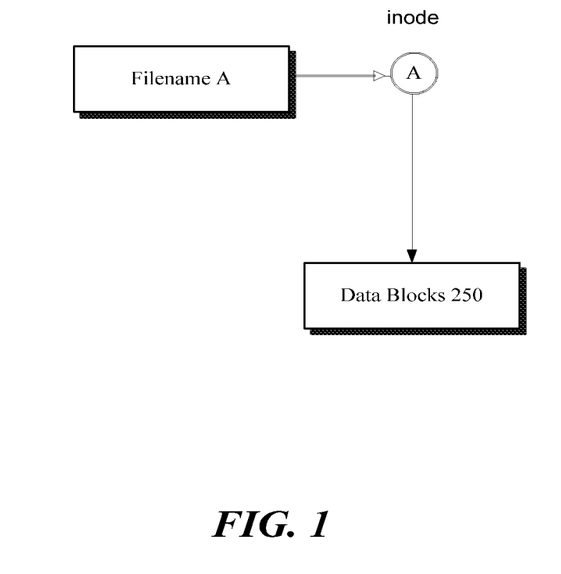
FIGS. 1 through 5 illustrates exemplary block diagrams representing a data file system in accordance with one or more embodiments, wherein a file is stored in the file system in an inode implemented data structure.

Referring to FIG. 1, in accordance with one embodiment, a file A in a file system may be identified by way of a filename (e.g., filename A) which points to a data file (herein also referred to as an "inode"), which in turn points to data blocks 250 where the actual data is stored. The data blocks that include the actual data may be fixed in size in a virtual or physical address space. In the context of this disclosure, actual data refers to the file content as opposed to metadata which is additional data that provides related information about the actual data.

The metadata may be stored in an inode that is identified by an integer number (e.g., i-number). Depending on implementation, an inode may be a data structure on a traditional Unix-style file system such as UFS or other viable alternative. An inode may for example store the relevant information about a file's ownership, access mode (read, write, execute permissions), and file type, as well as directory related information, or other file system object. An inode may not include the file's content and filename, depending on implementation.

Figure 2:
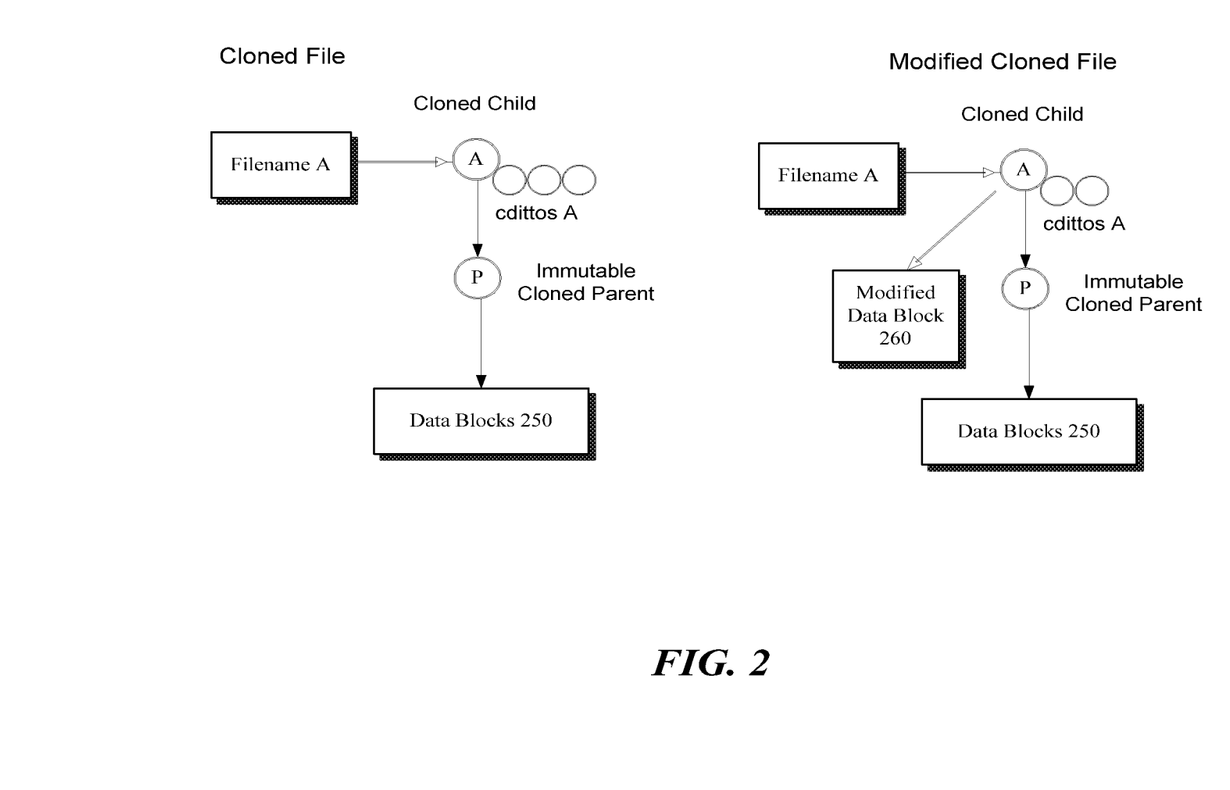

Referring to FIG. 2, a file system cloning mechanism may be utilized to create a snapshot (i.e., a clone) of a file. As illustrated in the left side of FIG. 2, a cloned file may be represented by a filename A pointing to a metadata file, which may be represented by a cloned child (i.e., inode A). Inode A, instead of having direct pointers to data blocks 250, has pointers (i.e., cdittos A) to a parent data file P (e.g., an immutable cloned parent). The parent data file P, in turn, points to data blocks 250. The term immutable in this context indicates that data blocks 250 may not be modified in case of an update to the file content.

If a data block in data blocks 250 is to be modified (e.g., due to a write operation), according to one embodiment, a corresponding cditto pointer of the clone child A is replaced with a pointer to a newly created data block 260 which includes the modified data. The original data block, however, remains intact as illustrated in the block diagram depicted on the right hand side of FIG. 2. As shown, the file structure for cloned file A includes two nodes: a cloned parent node P and a cloned child node A. As a result, in one embodiment, to access the data blocks 250, the child inode A will go through the parent inode P, as opposed to directly pointing to the data blocks 250 (see FIG. 2 in comparison with FIG. 1).

Figure 3:
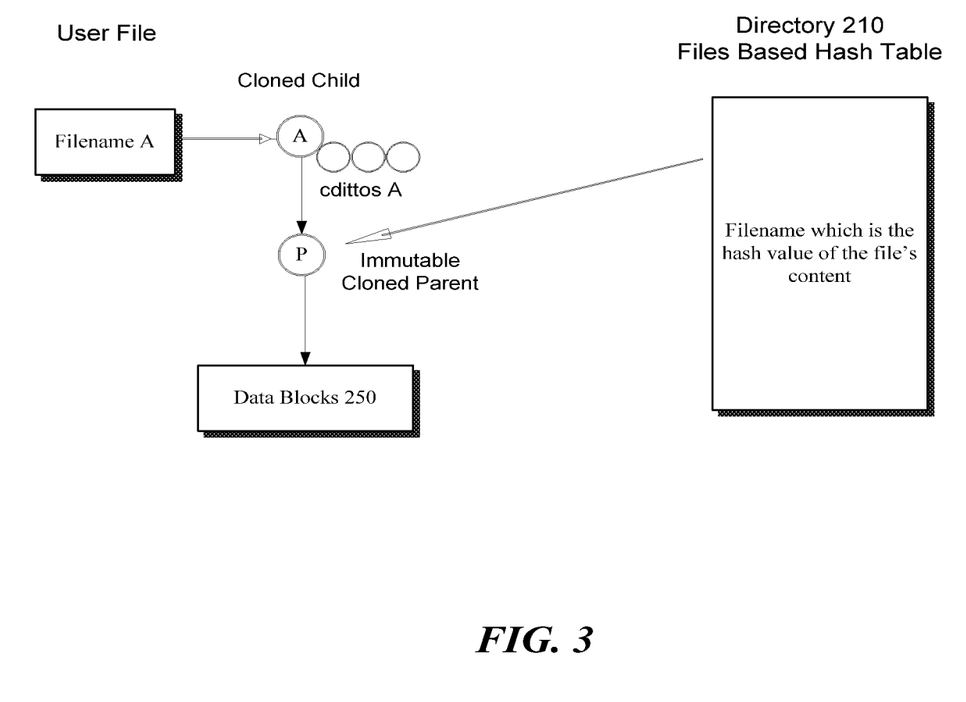

Referring to FIG. 3, the tracking of files in the file system may be accomplished by way of a directory 210 (e.g., an indexing data structure) that is used to maintain and manage the location of storage of each file by providing an association between the filename and the inode for the respective file in the storage system. In an example embodiment that supports full file deduplication, the directory 210 may include a hash table (not shown separately). The hash table provides an indirect reference to file content stored on data blocks 250 by mapping the filename, which may be the hash value of the content, to an inode P that points to data blocks 250.

Depending on implementation, a full file deduplication system in accordance with one embodiment may be provisioned based on the construct illustrated in FIG. 3, such that when a new file is added to the storage system, the file is cloned and a corresponding entry for the file is created in the directory 210. Cloning of the file involves the creation of two inodes—i.e., the parent inode and the child inode. The entry in the directory 210 may be created based on the hash value of the filename, for example, or other indexing method. An entry in the directory points to the respective parent inode P, illustrated as the child inode A pointing to parent inode P.

In the above implementation, if a file's content is modified, the corresponding directory entry remains pointing to the data blocks 250 by way of the cloned parent inode P. As such, the filename entry in the directory continues to be associated with data blocks 250, which are unmodified. Thus, the corresponding entry in the hash directory 210 remains consistent as the file name carrying the hash value of the respective content points to the cloned parent P that points to data blocks 250 that are consistent with the file name.

In one embodiment, the modified blocks are accounted for using a background process that, for example, scans directory 210 for entries that are marked as 'modified'. The modified blocks together with the data blocks 250 to which the cloned parent continues to point may be treated as new content (e.g., a new file) that may or may not have duplicates in the storage system. The background process may thus scan directory 210 for files that are marked 'modified' and calculate the hash of the new content and based on the result decide whether a duplicate for the content already exists in the storage system and if so take the appropriate action.

Figure 4:
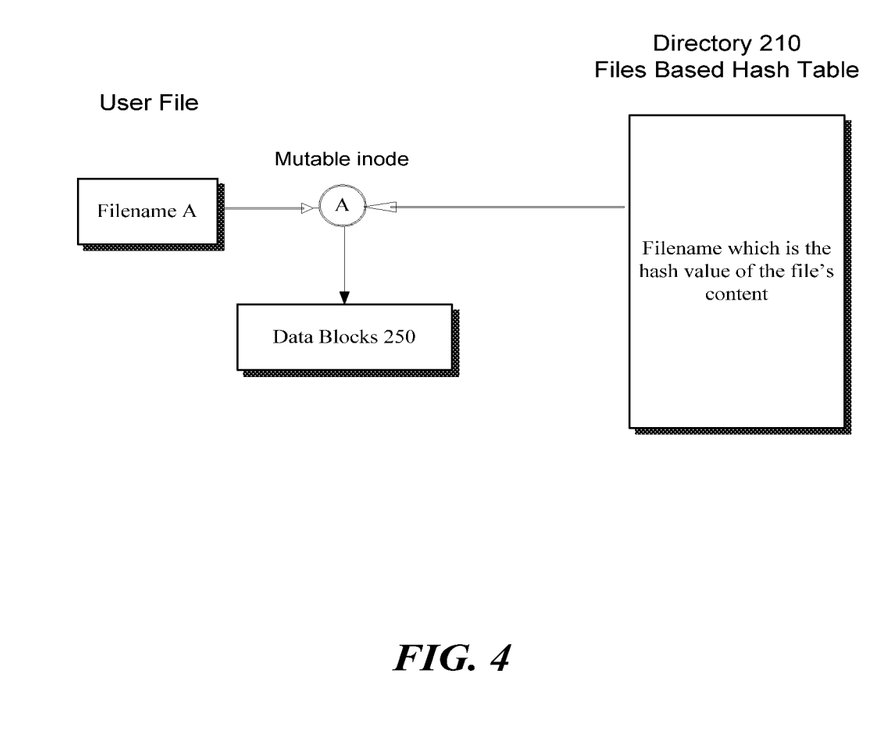
Figure 6:
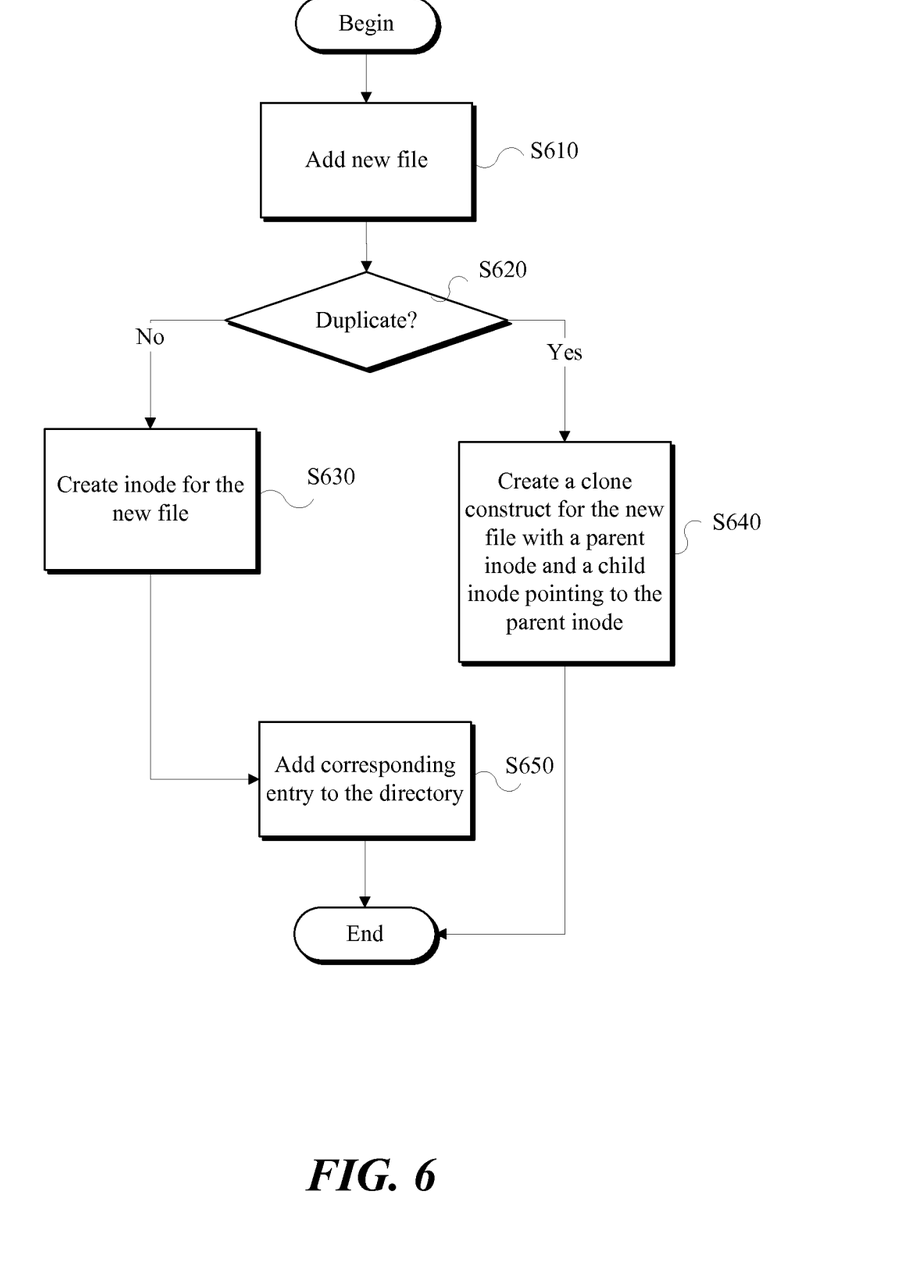
FIG. 6 is a flow diagram of an exemplary method for optimizing data deduplication, in accordance with one embodiment.

The above exemplary inode implementation may result in a multi-step routine for accessing the data blocks 250, because once the system has the filename for a target file, it will first find the cloned child inode A and from that the cloned parent inode P, and from there the location of data blocks 250 for the target file. Referring to FIGS. 4 and 6, in one embodiment, to reduce the number of steps involved in a file access process, at the time a new file is to be added to the storage system (S610), it is determined whether a duplicate copy of the file content is already stored in the storage system (S620).

If a duplicate copy of the file content is not in the storage system, in one embodiment, an inode A is created, and an inode P as in the above discussed implementations is not created (S630). Inode A may be mutable. A corresponding entry may be also created in the directory 210 (e.g., wherein the index to the entry is the hash value of the file content) (S650). The directory entry provides a reference to inode A, which desirably directly points to data blocks 250 that include the content of the new file.

Figure 5:
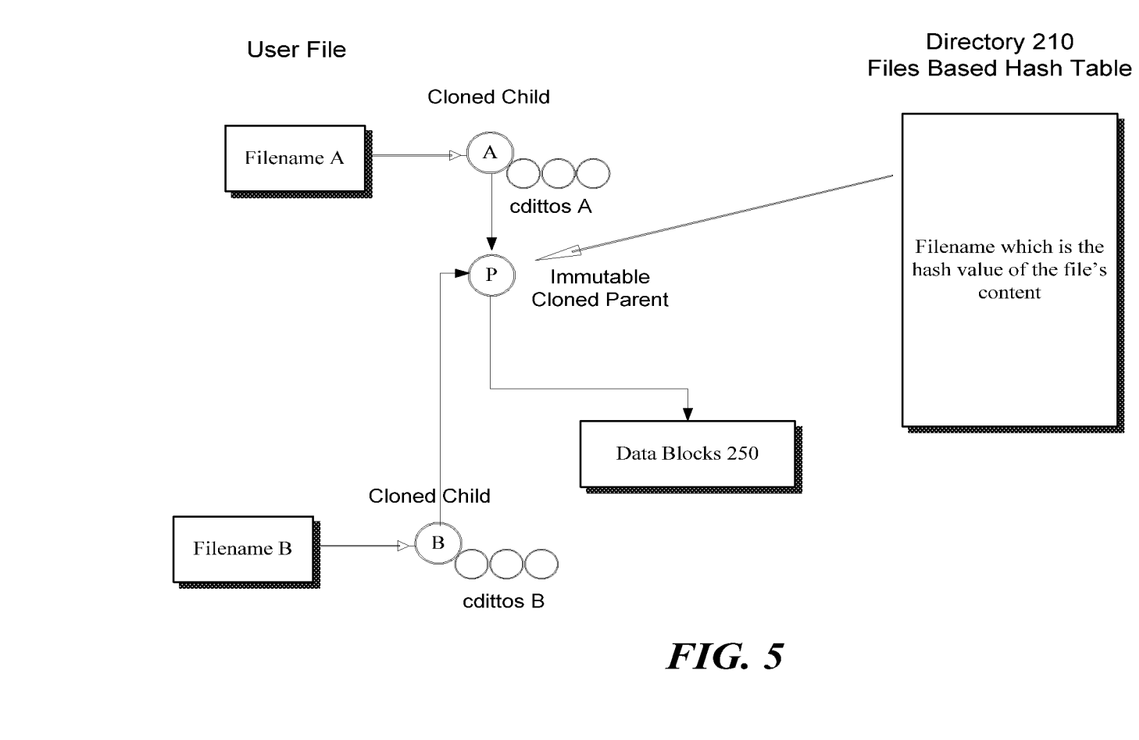

Referring to FIGS. 5 and 6, if it is determined that a duplicate copy of the file content, for the new file that is to be added to the storage system, already exists in the file system (e.g., by comparing the hash value of the new content with the hash value of content for other filenames already in the directory 210), then a clone construct as discussed earlier with respect to FIG. 3 may be implemented for the new file resulting in the creation of a parent inode and a child inode that points to the parent inode (S640). In case of a first duplicate, the clone construct is also applied to the file with the duplicate content already stored in the file system, as provided in further detail below.

In other words, in a scenario where the new file is going to be a first duplicate of an existing file in the file system (i.e., starting with the example scenario shown in FIG. 4), in accordance with one embodiment, a clone construct for the existing file is created (see FIG. 5, wherein a parent inode in addition to a child inode is created for the existing file A). In addition, a clone construct for the new file (e.g., file B) is created, and the new file's cloned child inode B is pointed to the parent inode P for the existing file. That is, the cloned child inode B points to the parent node P for the existing file A, instead of pointing to the parent inode P for the new file B.

The parent inode P for the new file, depending on implementation, may be removed along with the data blocks it is pointing (e.g., by way of a garbage collection process). In other embodiments, the parent inode P for the new file may not be created when it is determined that the new file is a duplicate. Further, in a scenario where the new file is not going to be the first duplicate (e.g., it is a second or third duplicate), a clone construct for the existing file need not be created, because it already exists. However, a clone construct for the new file is created and depending on implementation, the clone construct for the new file may result in the creation of a child inode by itself, or a child inode and a parent inode, wherein the parent inode is removed and the child inode is configured to point to the parent inode of an existing duplicate.

In the example shown in FIG. 5, files A and B represented by filename A and filename B are included in the file system by way of cloned children inodes A and B, respectively. Both of the cloned child inodes A and B point to a common cloned parent inode P. The cloned parent inode P may be immutable and may provide a pointer to the data blocks 250 where the content for file A and its duplicate file B is stored. Thus, as shown, when a file that is identified as a clone is added to the file system, the clone construct is created and is used for both the new file and the duplicate, as provided earlier.

Referring back to FIG. 4, if a file in the file system is modified before a duplicate is identified for that file, the corresponding directory entry points to data blocks 250 having content that is inconsistent with the entry name, where the directory entry is implemented as, for example, the hash value on the data blocks content before the content was modified. In order to correct such inconsistent directory state, the inode with the updated content is tagged by way of setting an associated flag or indicator value, for example. Depending on whether the system supports inline or offline deduplication or both, different approaches may be applied to regain directory consistency for an updated inode.

In an offline scenario, a background process may be executed to find updated files according to the tagged status of the respective inodes. Once the tagged files are found, then the value of the directory entry for such files is calculated (e.g., based on the hash value of the file content). The calculated value is inserted in the corresponding directory entry with a name that, for example, reflects the new modified content of the file. Another background process may be also implemented to search for directory entries that point to content that does not match the filenames the entries are associated with. Such entries may be deleted from the directory 210 because they are no longer valid. Further, inodes that are tagged as updated are not deduplicated until the temporarily created directory inconsistency is corrected. Once corrected, the tags are removed and the files are deduplicated in a subsequent deduplication round.

In an inline scenario, when a remote client tries to upload a new file to the file system, an index value (e.g., a hash value) of the file's content is provided and added to the directory 210 as an entry. However, if the index value already exists in the directory 210, the client may not need to upload the file, as its content already exists in the file system. If the appropriate entry exists but points to an inode that was marked as changed, such scenario is treated as if that entry does not exist so that the new file is added to the file system.

In addition, in one embodiment, the outdated (i.e., stale) directory entries are deleted in real time when the client completes uploading the new file and the directory entry for the new file is added to the directory 210. If, however, the stale entry still exists in the directory, the addition of a new entry to the directory will not take place and the uploaded file will be treated as in the offline scenario. If the duplicated filenames are removed from the file system, such that only a single copy of the content is left, then the inode structure is changed from that depicted in FIG. 5 to what is depicted in FIG. 4, so that the mutable inode directly points to the data blocks for the corresponding file in the file system which now has no duplicates in the file system.

Thus, in accordance with one or more embodiments, an inode implemented file system may be utilized to support both offline and inline deduplication. When the first content is stored in the storage medium, one inode is used to associate a filename with the data blocks where the first content is stored. When a second content that is a duplicate of the first content is to be stored, then a parent inode is created to point to the data blocks in which a copy of the first content is stored. Further, two inodes are created, one representing the first content and the other representing the second content. Both inodes point to the same parent inode that points to the data blocks where the first content is stored.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 7A:
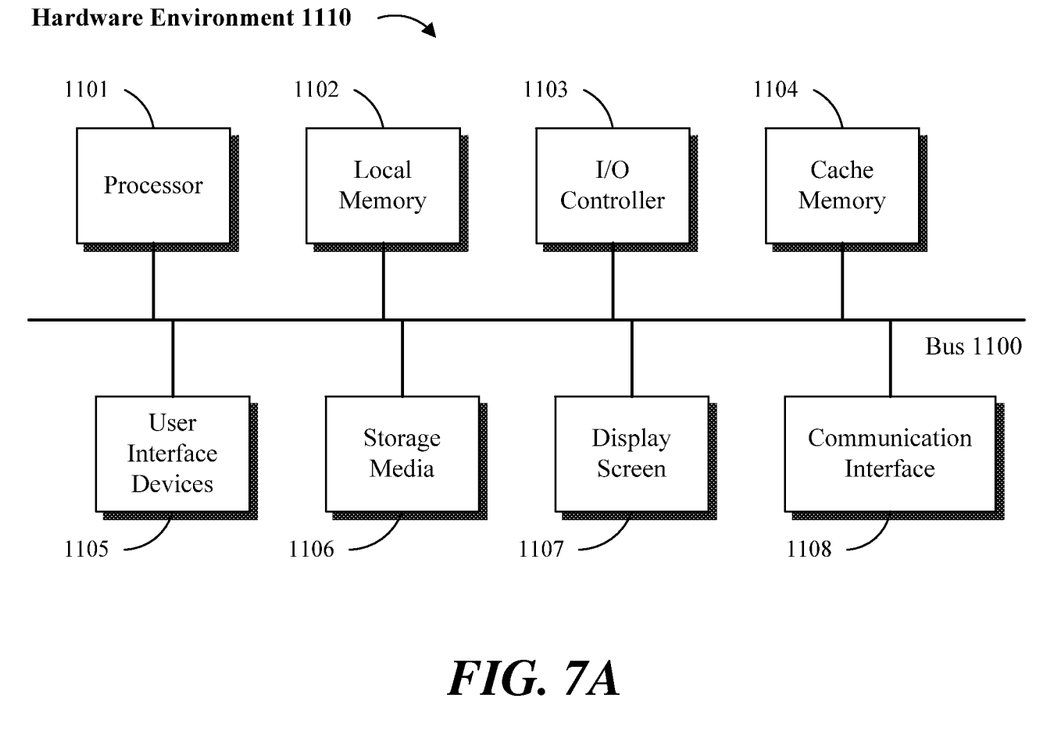
FIGS. 7A and 7B are block diagrams of hardware and software environments in which the disclosed systems and methods may operate, in accordance with one or more embodiments.
Figure 7B:
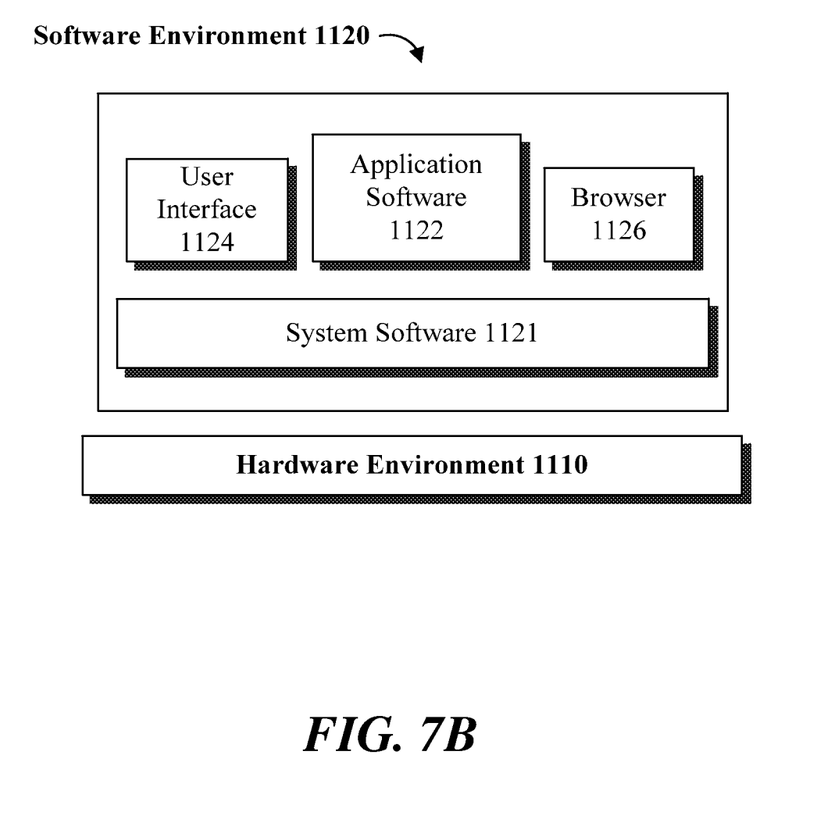

Referring to FIGS. 7A and 7B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 7A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 7B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing.

Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for optimizing deduplication in a data storage system, the method comprising:

creating a first node to associate a first file name with first data blocks in the data storage system where first content associated with the first file is stored, wherein an association between the first file name and the first content is established by way of a data structure including the first file name pointing to the first node and the first node pointing to the first data blocks; and in response to determining that second content associated with a second file is to be stored in the data storage system, calculating a first value based on a function applied to the first content and calculating a second value based on the function applied to the second content;

in response to determining that the second value matches the first value:

concluding that the second file is a duplicate of the first file;

designating the first node as a first parent node to point to the first data blocks where the first content is stored;

creating a first child node representing the first file;

creating a second child node representing the second file; and pointing the first child node and the second child node to the first parent node.

2. The method of claim 1, wherein if it is determined that third content to be stored in the data storage system is a duplicate of the first and the second contents, the method further comprises:

creating a third child node representing the third content; and pointing the third child node to the first parent node.

3. The method of claim 1, wherein the second content, which is determined to be a duplicate of the first content, is stored in the data storage system, wherein a second parent node is created to which the second child node points and the second content is stored in second data blocks in the data storage system.

4. The method of claim 3, further comprising removing the second parent node from the data storage system after pointing the second child node to the first parent node.

5. The method of claim 3, further comprising removing the second content from the second data blocks after pointing the second child node to the first parent node.

6. The method of claim 5, wherein the removing is performed by way of a garbage collection mechanism.

7. The method of claim 1 wherein a first entry exist in an indexing data structure, wherein the first entry points to the first parent node, the method further comprising:

copying third content to third data blocks, in response to receiving a request that the second content is to be replaced with the third content;

providing a pointer to the third data blocks from the second node.

8. The method of claim 7 further comprising indicating that a second entry in the indexing data structure is to be created to reflect that the second content is replaced with the third content.

9. The method of claim 8 further comprising creating the second entry in the indexing data structure to point to the third content.

10. The method of claim 9 wherein the second entry in the data structure includes hash value of the third content.

11. A system for optimizing deduplication in a data storage system, the system comprising:
- a logic unit for creating a first node to associate a first file name with first data blocks in the data storage system, having at least one non-transitory data storage medium, where first content associated with the first file is stored, wherein an association between the first file name and the first content is established by way of a data structure including the first file name pointing to the first node and the first node pointing to the first data blocks; and
- one or more logic units that, in response to determining that second content associated with a second file is to be stored in the data storage system, calculate a first value based on a function applied to the first content and calculate a second value based on the function applied to the second content and in response to determining that the second value matches the first value:
  - designate the first node as a first parent node to point to the first data blocks where the first content is stored;
  - create a first child node representing the first file;
  - create a second child node representing the second file; and
  - point the first child node and the second child node to the first parent node.

12. The system of claim 11, wherein if it is determined that third content to be stored in the data storage system is a duplicate of the first and the second contents, a third child node representing the third content is created; and the third child node is pointed to the first parent node.

13. The system of claim 11, wherein the second content, which is a duplicate of the first content, is stored in the data storage system, wherein a second parent node is created to which the second child node points and the second content is stored in second data blocks in the data storage system.

14. The system of claim 13, wherein the second parent node is removed from the data storage system after pointing the second child node to the first parent node.

15. A computer program product comprising a non-transitory computer readable storage medium having a computer readable program, wherein the computer readable program when executed on a computer causes the computer to:
- create a first node to associate a first file name with first data blocks in the data storage system where first content associated with the first file is stored, wherein an association between the first file name and the first content is established by way of a data structure including the first file name pointing to the first node and the first node pointing to the first data blocks; and
- in response to determining that second content associated with a second file is to be stored in the data storage system, calculate a first value based on a function applied to the first content and calculate a second value based on the function applied to the second content and in response to determining that the second value matches the first value:
  - designate the first node as a first parent node to point to the first data blocks where the first content is stored;
  - instantiate a first child node representing the first file;
  - instantiate a second child node representing the second file; and
  - point the first child node and the second child node to the first parent node.

16. The computer program product of claim 15, wherein if it is determined that third content to be stored in the data storage system is a duplicate of the first and the second contents, a third child node representing the third content is instantiated; and the third child node is pointed to the first parent node.

17. The computer program product of claim 15, wherein the second content, which is a duplicate of the first content, is stored in the data storage system, wherein a second parent node is created to which the second child node points and the second content is stored in second data blocks in the data storage system.

18. The computer program product of claim 17, wherein the second parent node is removed from the data storage system after pointing the second child node to the first parent node.

19. The computer program product of claim 17, wherein the second content is removed from the second data blocks after pointing the second child node to the first parent node.

20. The computer program product of claim 15 wherein a first entry exist in an indexing data structure, wherein the first entry points to the first parent node, wherein a second entry is added to the indexing data structure, in response to determining that the second content is stored in the data storage system, and third content is copied to third data blocks, in response to receiving a request that the second content is to be replaced with the third content; and a pointer is provided to the third data blocks from the second node.

* * * * *